March 13, 1928.
C. O. NORBERG
1,662,392
TRACTION DEVICE FOR MOTOR VEHICLES
Filed Aug. 6, 1925
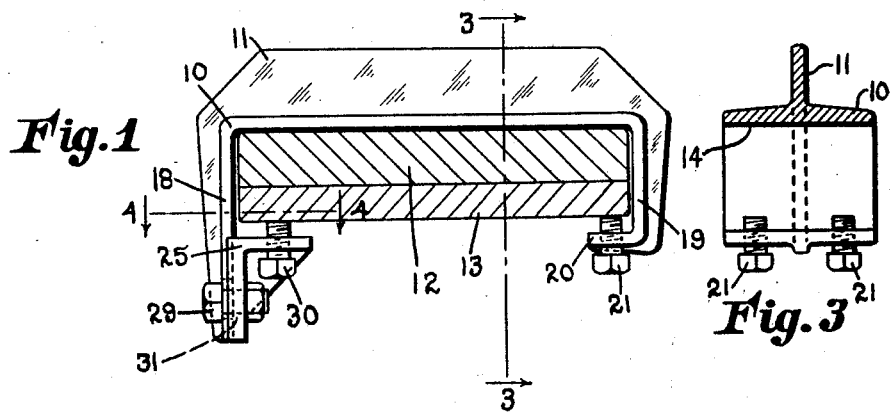
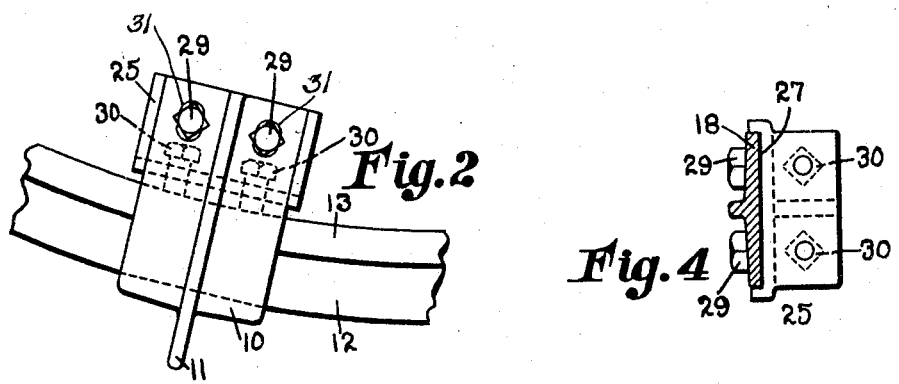
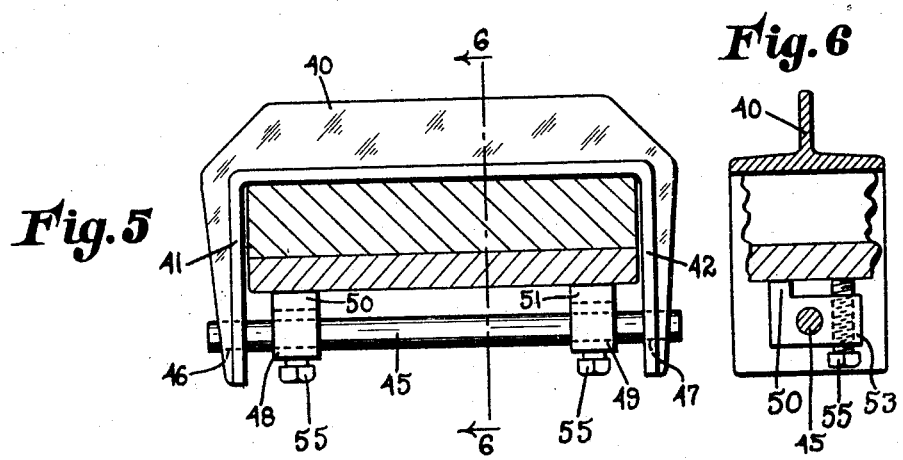
WITNESS
Harold W. Eaton
INVENTOR
Carl O. Norberg
BY
Clayton L. Jenks
ATTORNEY Patented Mar. 13, 1928.

1,662,392

UNITED STATES PATENT OFFICE.

CARL O. NORBERG, OF WORCESTER, MASSACHUSETTS.

TRACTION DEVICE FOR MOTOR VEHICLES.

Application filed August 6, 1925. Serial No. 48,633.

My invention relates to a traction device and more particularly to a device which can be removable attached to the wheel of a motor vehicle to increase the tractive effort of the wheel and minimize the tendency for the wheel to spin idly when on soft ground.

Heretofore, various contrivances have been devised to aid motor vehicles in getting sufficient traction to pull themselves out of mudholes, sandbanks, snowdrifts and the like. Of these devices, the most popular is the tire chain made up of two parallel side chains connected by cross chains, but these have not proven wholly satisfactory in use on heavy pleasure cars or trucks, as the cross chains are not fastened fixedly in position, and are smooth surfaced and they tend to imbed themselves into the rubber tire thread and do not give the desired amount of traction between the vehicle and road. Moreover, if the vehicle wheel is already mired in a mud hole, it is not a simple or pleasurable occupation to fasten chains around the periphery of the wheel. Another form of chain in use is a single loop fastened loosely around the tire and rim, but the tractive effort of this type is not always sufficient for the needs of the occasion.

Mud lugs, of the type of a paddle wheel, have been fastened to wheel rims for this purpose, but these have not met with popular approval for various reasons. One difficulty is that, if such a device fits the wheel when the tire is new, it becomes loose after the tire has become worn, and so is liable to injure the tread or itself become broken. Such a device does not lend itself for use on various sizes of wheels but must be made to fit one particular size and style of wheel.

It is accordingly an object of my invention to overcome such difficulties and to provide a simple, economical and highly efficient traction device which may be readily and removably attached to the rim of a motor vehicle wheel no matter what may be the condition of the tire to which it is adapted.

It is a further object of my invention to provide a traction device which has a mud lug extending across the face of the tire and which is provided with adjustable clamping means so arranged that the device may be rigidly fitted to the rim and tire of a wheel and quickly removed therefrom, and which is serviceable for a number of shapes and sizes of wheels.

Other objects will be apparent from the following disclosure.

I have illustrated herein one embodiment of my invention as disclosed in the accompanying drawings in which like reference numerals indicate like parts:

Fig. 1 is a front elevation of my traction device attached to the rim of a motor vehicle wheel;

Fig. 2 is an end elevation of my device shown clamped onto a fragment of a wheel rim;

Fig. 3 is a sectional view taken approximately on the line 3—3 of Fig. 1;

Fig. 4 is a sectional view taken approximately on the line 4—4 of Fig. 1;

Fig. 5 is a front elevation of a modified form of my traction device; and

Fig. 6 is a cross sectional view of my modified device taken approximately on the line 6—6 of Fig. 5.

In accordance with my invention, I provide a device having a mud lug or flange arranged to project radially from the wheel, like a paddle, and engage the ground, and this traction flange is fastened in proper position by means of a U-shaped body projecting adjacent the sides of the wheel tire and having clamping means engaging the inside of the tire rim or associated parts to permit adjusting the device to fit the wheel. In my preferred construction, I employ a device that will project a sufficient distance from the surface of the tire tread to give large driving traction with the road surface. As shown in the drawings, this comprises a substantially T-shaped metal body 10 having a flange or lug 11 of such a size that it will extend across the face of the tire 12 which is mounted on the usual rim 13 of the wheel. To prevent the device from imbedding too deeply into the surface of the tire tread, I preferably make the inside surface 14 of the T-shaped portion of considerable width so that when the device is secured in position it will not cut or damage the surface of the tire tread.

To clamp the device securely in position on the tread, I have shown the member 11 as provided with downwardly extending arms 18 and 19, forming the two sides of a U-shaped body, which are also of a substantially T-shaped construction for the sake of strength and rigidity. These arms are arranged to be clamped at their inner ends to the rim of the wheel by adjustable devices. As illustrated, the lower end of the arm 19 is turned inwardly to form a projection 20 to provide a support for the clamping screws 21 which are screw-threaded therethrough. This lug or projection is adapted to be hooked over one edge of the wheel rim. In order that the other arm of the device may be readily attached to and detached from the rim of the wheel, I make it straight sided and provide it with a removable hook portion so arranged that the latter may be removed and the device then swung into place across the rim of the wheel. To this end, I preferably form the hook portion of an angle-iron 25 having one of its surfaces formed with a depression 27 to partially surround the arm 18. This iron 25 may be removably fastened to the arm 18 by suitable means such as the bolts 29. In order to permit clamping the device removably to a tire, I thread a bolt 30 through the angle iron 25, similar to the bolt 21, and I so arrange these parts that the bolts may be turned in their screw threaded settings to clamp at their inner ends against the rim of the wheel and thus draw the device tightly into position. By locating the bolt 29 in an elongated slot 31 in the arm 18 I may adjust the clamping angle iron 25 towards and from the wheel rim and thereby secure greater freedom of adjustment of the device.

The type of clamping device above described is preferably employed where disc wheels are used on the motor vehicle but is adaptable to use on other types as well. For wheels having spokes, I may utilize a simpler form, as shown in the modification in Figs. 5 and 6. As there illustrated, I employ a similarly shaped flanged device having a member or body 40 substantially T-shaped in cross section. Projecting from the member 40 at right angles thereto are the arms 41 and 42 which are also of T-shape in cross-section.

To permit clamping this form of device to the rim of a motor vehicle wheel, I utilize a means that will securely hold and clamp at both ends and in adjustable position transversely of the wheel. This comprises a cylindrical bar 45 which passes freely through the openings 46 and 47 in the arms 41 and 42 respectively. Slidably mounted on this bar are clamping members 48 and 49 provided with projecting portions 50 and 51 which are of sufficient length to engage the inner perimeter of the wheel rim. The projections or lugs 50 and 51, as shown in Fig. 6, are offset relative to the rod 50 and on the opposite side of each pivotal mount formed by the bar are the projections or lever arms 53 provided with screw-threaded apertures into which are fitted the clamping screws 55. It will be readily apparent from this disclosure that as the screws 55 are tightened, the clamping members 48 and 49 will rock about the bar 45 as a pivot so that the lugs 50 and 51 will be clamped rigidly against the inner perimeter of a wheel rim. By adjusting these screws individually the device may be clamped on to wheels no matter how irregular the surface may have been worn.

It will also be understood that while I have illustrated and described but one of these devices, as applied to a wheel, in actual use it may be desirable to utilize several spaced about the perimeter of the driving wheels. The operation and utility of this construction will be apparent from the above disclosure. When it is found that the vehicle wheels are not securing sufficient grip on the road, the driver has but to clamp one or more of these devices to each driving wheel, which may be done conveniently and easily. The adjustments of the device make it possible to clamp the device immovably in place and thus obviate the danger of breaking a wheel spoke. Other advantages will be readily apparent to one who is familiar with the problem of driving a heavy vehicle over cross-country roads.

Having thus described my invention, what I claim as new and desire to secure by Letters Patent is:

1. A traction device for a vehicle wheel comprising a flat member engaging the tire of the wheel, a flange projecting outwardly therefrom, two arms adapted to extend past the sides of the tire, one arm having a hook thereon, a screw-threaded member adjustably mounted on the hook to engage the wheel rim and an adjustable clamping device on the other arm, said parts being so constructed and arranged that the device may be hooked over and clamped to the wheel rim and held rigidly in position thereon.

2. A traction device for a vehicle wheel comprising a T-shaped body portion having a flat plate engaging the wheel tire, a flange projecting outwardly from the plate and two arms extending inwardly past the sides of the wheel rim, a screw-threaded member mounted on one arm and arranged to adjustably engage the inner surface of the wheel rim, an angle iron adjustably and removably attached to the other arm to project over the wheel rim and a clamping screw threaded through the angle iron to engage said rim.

Signed at Worcester, Massachusetts, this 31st day of July, 1925.

CARL O. NORBERG.